(12) United States Patent  (10) Patent No.: US 8,310,451 B2
Qin et al.  (45) Date of Patent: Nov. 13, 2012

(54) INFORMATION EXCHANGE DEVICE

(75) Inventors: Zhong Qin, Shanghai (CN); Yanna Hao, Shanghai (CN); Shengyang Wang, Shanghai (CN); Rushan Pan, Shanghai (CN); Keyi Wang, Shanghai (CN)

(73) Assignee: Shanghai Super Electronics Technology Co. Ltd, Shanghai (CN)

( * ) Notice: Subject to any disclaimer, the term of this patent is extended or adjusted under 35 U.S.C. 154(b) by 497 days.

(21) Appl. No.: 12/561,071

(22) Filed: Sep. 16, 2009

(65) Prior Publication Data

US 2010/0231520 A1 Sep. 16, 2010

(30) Foreign Application Priority Data

Mar. 12, 2009 (CN) .......................... 2009 1 0047434

(51) Int. Cl.
    *G06F 3/02* (2006.01)
(52) U.S. Cl. ......... 345/168; 345/158; 345/169; 345/172
(58) Field of Classification Search .................. 345/168, 345/158, 169, 172, 419; 340/5.61, 10.1, 340/572.1, 568.1; 455/205, 41.2, 66.1
    See application file for complete search history.

(56) References Cited

U.S. PATENT DOCUMENTS

| 7,602,275 B2 * | 10/2009 | Dishongh et al. ........ 340/309.16 |
| 2004/0111360 A1 * | 6/2004 | Albanese ........................ 705/38 |
| 2005/0076034 A1 * | 4/2005 | Addonisio et al. .............. 707/10 |
| 2006/0025897 A1 * | 2/2006 | Shostak et al. .................... 701/1 |
| 2007/0034692 A1 | 2/2007 | Johnson |
| 2007/0041476 A1 | 2/2007 | Seon |
| 2007/0046468 A1 * | 3/2007 | Davis ......................... 340/572.1 |
| 2007/0175995 A1 | 8/2007 | Maniwa et al. |
| 2007/0176746 A1 | 8/2007 | Lee et al. |
| 2007/0176747 A1 | 8/2007 | Yang et al. |
| 2007/0224938 A1 * | 9/2007 | Jung et al. .................... 455/41.2 |

(Continued)

FOREIGN PATENT DOCUMENTS

CN 201084154 Y 7/2008

(Continued)

OTHER PUBLICATIONS

Jose Luis Martinez Flores et al., "Performance of RFID tags in near and far field", IEEE, 2005, pp. 353-357.*

*Primary Examiner* — Thuy Pardo
(74) *Attorney, Agent, or Firm* — Ming Chow; Sinorica, LLC

(57) ABSTRACT

An information exchange device contains the outside framework, the front panel and the back panel, a vacant space is formed inside of the outside framework. In the vacant space, a control circuit is disposed which includes a micro-control unit with the control procedure inside, a batter unit connected with the micro-control unit, a keyboard unit connected with the input of the micro-control unit, a RF unit having a two-way communication links with the micro-control unit, an antenna unit connected with the RF unit and used for receiving and sending at the working frequency of 2.45 GHz, a LCD display unit connected with the output of the micro-control unit, a near-distance RFID with a working frequency of 13.56 MHz. The information exchange device of the present invention adopts the 2.45 GHz as the working frequency and having a near-distance RFID disposed inside, as a result that the information exchange of long-distance, low-power, anti-collision achieves and the short distance RF communication achieves.

14 Claims, 3 Drawing Sheets

U.S. PATENT DOCUMENTS

| | | | |
|---|---|---|---|
| 2008/0274709 A1* | 11/2008 | Goto | 455/205 |
| 2009/0009330 A1 | 1/2009 | Sakama | |
| 2009/0051533 A1* | 2/2009 | Roesner | 340/572.1 |
| 2009/0066509 A1* | 3/2009 | Jernstrom et al. | 340/568.1 |
| 2009/0153294 A1* | 6/2009 | Katagiri et al. | 340/5.61 |
| 2009/0243959 A1* | 10/2009 | Pering et al. | 345/1.3 |
| 2010/0144284 A1* | 6/2010 | Chutorash et al. | 455/66.1 |
| 2011/0043515 A1* | 2/2011 | Stathis | 345/419 |
| 2011/0060758 A1* | 3/2011 | Schlotterbeck et al. | 707/769 |
| 2012/0007715 A1* | 1/2012 | Rofougaran et al. | 340/10.1 |
| 2012/0184200 A1* | 7/2012 | Chutorash et al. | 455/1 |

FOREIGN PATENT DOCUMENTS

| | | |
|---|---|---|
| CN | 201084179 Y | 7/2008 |
| CN | 101344931 A | 1/2009 |
| WO | WO2004097731 A2 | 11/2004 |
| WO | WO2006050412 A1 | 5/2006 |
| WO | WO2006109212 A1 | 10/2006 |

* cited by examiner

INFORMATION EXCHANGE DEVICE

FIELD OF INVENTION

This invention relates generally to the field of information exchange device. More specifically, the present invention is directed to active electronic tags based on RFID (Radio Frequency Identification) technology.

BACKGROUND OF THE INVENTION

With the development of RFID (Radio Frequency Identification), RFID could not only be attached on the items as the electronic tags, but could also be used as a tool for information exchange. For example, in the school, RFID can be used as the interactive tools between the teachers and the students. The teachers send RF (radio frequency) signal which contains the questions to the students by a reader, the students receive the said signal by RFID, and then the students send the RF signal which contains the answers to the teachers' readers by RFID. Hence, the information exchanges between the teachers and the students achieve.

In the above-mentioned applications, a reader needs to exchange information with many RFIDs. However, when a large number of RFIDs send the RF signal to the reader at the same time, the reader could only receive a certain number of RF signal sent by RFID, and as a result that it is very easy to cause the signal collision which further reduce the speed of the reader to read the RF signal sent by the RFIDs and further reduce the reliability of the information exchange between the readers and RFIDs. Therefore, the existing RFID can only be used in the occasion with a few people participate in, but can not meet the need of the wider scope. And the current RFID usually adopts the non-working microwave band (below 2.45 GHz) passive RFID, so the reading scope of RF signal which can be reliably received by the reader from RFID is limited, which limits the applications of RFID.

In view of the above-mentioned shortcomings of existing technology, it is necessary to provide an improved technology to overcome the said shortcomings.

SUMMARY OF THE INVENTION

One aspect of the present invention is to provide an information exchange device which uses the Microwave Frequency Band (2.45 GHz) as the working band. In said information exchange devices, the near-range RFIDs which use a working frequency band of 13.56 MHz are adopted to implement a far-range information exchange with low power dissipation and no signal collision and also to implement a near-range RF communication. Hence, an enlarge applications of the RFID achieves.

In order to achieve the above objectives, the main techniques of present invention is to provide an information exchange device, which includes a outside framework, a front panel and a back panel, wherein the front panel is embedded in the front surface of the outside framework, wherein the back panel is embedded in the back surface of the outside framework, thus a vacant space is formed at the internal of the outside framework. The vacant space further comprises a control circuit used for controlling the information exchange between the information exchange device and the reading system, which comprising:
a micro-control unit, which has a control program inside;
a batter unit, which connects with the micro-control unit and provides the power to the micro-control and also provide the RF (Radio Frequency) energy required by the communication between the information exchange device and the reading system;
a keyboard unit, which connects with the input of the micro-control unit and sends the RF signal with the corresponding information to the microprocessor;
a RF unit, which has a two-way communication links with the Micro-control unit, and processed the RF singles transmitted by the keyboard unit and the RF singles received from the reading system;
an antenna unit, which connects with the RF unit and sends the RF signals transmitted by the keyboard to the reading system at the working frequency of 2.45 GHz and receives the RF signals sent by the reading system at the working frequency of 2.45 GHz;
a LCD display unit, which connects with the output of the micro-control unit and shows the information on the LCD display which include the corresponding information sent by the keyboard unit and the corresponding information sent by the reading system;
a near-distance RFID with the working frequency of 13.56 MHz, which is used to achieve the short distance RF communication.

By the above-mentioned technology, the information exchange device of present invention has a individual electric near-distance RFID with the is working frequency of 13.56 MHz in order to achieve the near-distance RF communication, such as the access control management, the micro-payment functions and so on. The information exchange device of present invention is active RFID with the working frequency of 2.45 GHz, which can achieve the information exchange of long-range, low-power and anti-collision. Because of the long-range nature of information exchange, the application scope is extended. It could be used to do personnel tracking and interactive teaching in the campus, hospital, nursing home, meeting places or other places. Since this information exchange device of the invention has the characteristics of low power, the batter unit can maintain the information exchange device working more than 5 years. Hence, the present invention has the advantage of long-term use and maintenance-free. Due to the characteristics of the anti-collision, the reliability of information exchange has been increased to meet the use of information exchange device on a large-scale occasion with many participants.

Further, the micro-control unit, the keyboard unit, the RF unit and the antenna unit are positioned in the printed circuit board. The LCD display unit includes LCD display and LCD back film disposed under the LCD display. The LCD display has a flat wire which is connected with the printed circuit board. The batter unit is connected with the printed circuit board. A seal groove used to set a specific control procedure to the micro-control unit and a block used to fill the seal groove are both disposed on the back panel. The vacant space has a inner framework and the near-distance RFID is disposed between the under surface of the inner framework and the inside surface of the back panel. The LCD display unit is disposed between the top surface of the inner framework and the printed circuit board, while the batter unit is disposed on the inner surface of the back panel. The inner framework has a groove on its top surface, and a perforation is disposed inside of the groove. The LCD display unit is installed in the groove, while the near-distance RFID is positioned in the perforation. The printed circuit board has a keyboard slot thereon which is used to cover the keyboard unit and a LCD trough thereon which is used to cover the LCD display. The back panel has a vacant trough which the near-distance RFID disposed therein. By above simple structure, is the information exchange device of this present invention is portable with the characteristics of small thickness.

Furthermore, the keyboard unit is a capacitive touch sensor keyboard, which make the information exchange device of the present invention has the characteristics of anti-fouling, waterproof and anti-wear, as a result that the information exchange device can be long-term used under the harsh environment.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative.

DETAILED DESCRIPTION OF SPECIFIC EMBODIMENTS

Figure 1:
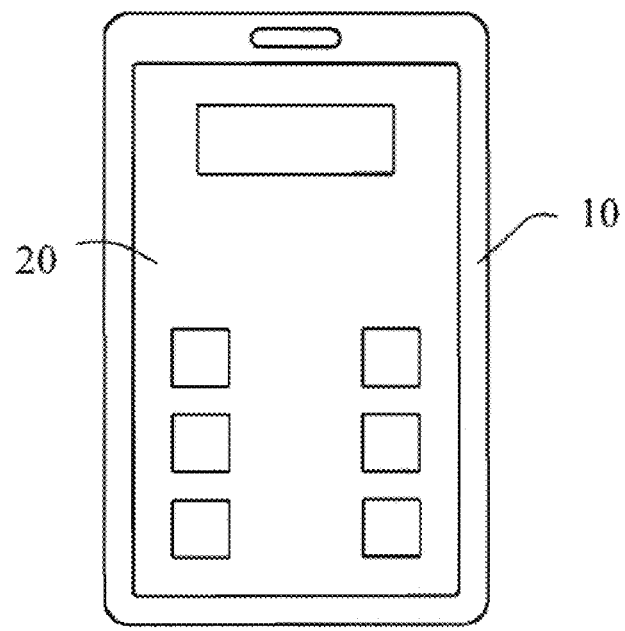
FIG. 1 is the front view of the information exchange device of the present invention.
Figure 2:
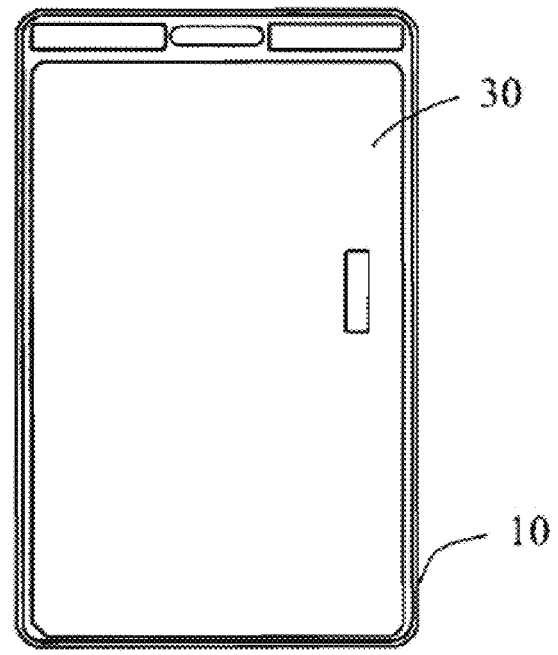
FIG. 2 is the back view of the information exchange device of the present invention.

As shown in FIG. 1 and FIG. 2, the information exchange device of the present invention is card-like with a certain thickness and includes a to framework 10, a front panel 20 and a back panel 30 outside, wherein the outside framework 10 is a frame with a certain thickness. The front panel 20 is embedded in the front surface of outside framework 10, while the back panel 30 is embedded in the back surface of outside framework 10, thus a vacant space is formed at the internal of outside framework 10.

Figure 3:
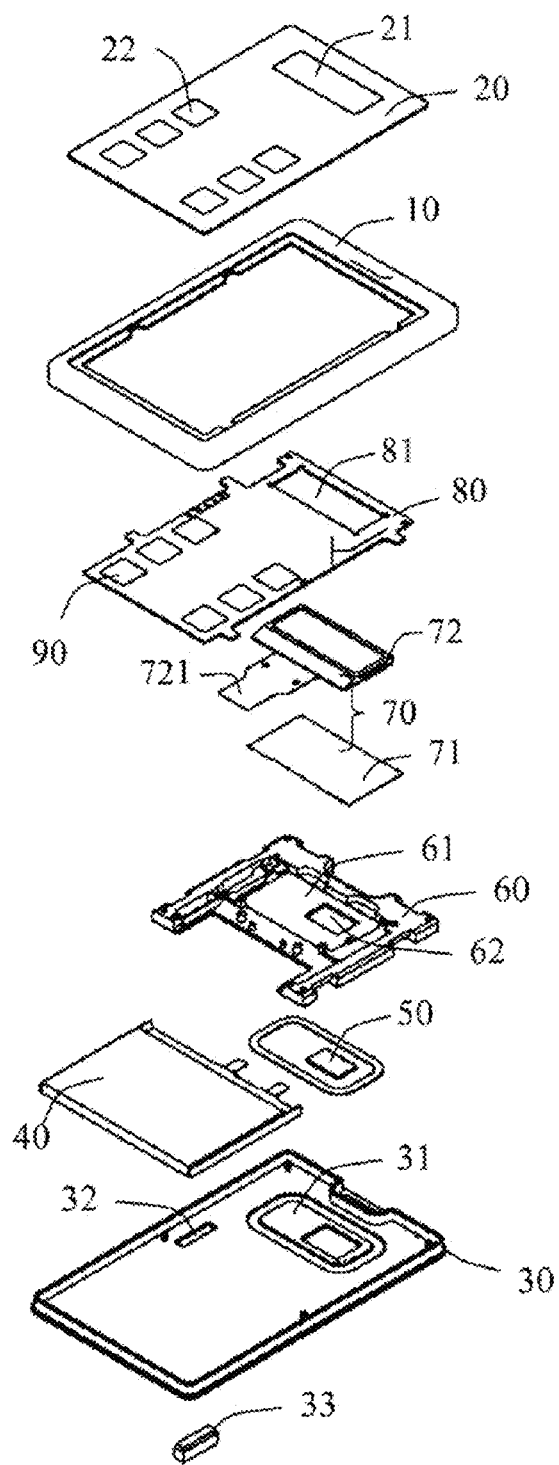
FIG. 3 is the structure exploded view of the information exchange device of the present invention.

FIG. 3 further illustrate the internal structure of the information exchange device of the present invention. A battery unit 40, a near-distance RFID 50, a inside framework 60, a LCD display unit 70 and a printed circuit board 80 are disposed in the vacant space which is inside of the outside framework 10. As shown in FIG. 3, a LCD trough 21 and a keyboard slot 22 are disposed in the front panel 20, while a vacant trough 31 and a seal groove 32 are disposed in the inner surface of back panel 30. The battery unit 40 is installed on the inner surface of the back panel 30, which is used to supply electricity to the information exchange device of the present invention. The near-distance RFID 50 is installed at the vacant trough 31 of the back panel 30. The work frequency band of the near-distance RFID 50 is 13.56 MHz. The near-distance RFID 50 includes the basic components (these basic components belong to the existing technologies, so do not praise references), so that it can realize the short distance RF communication. The inner framework 60 is a rectangular plate having a groove 61 on the upper surface, wherein the groove 61 has a rectangular perforation 62 inside. The size of the rectangular perforation 62 matches the size of the near-distance RFID 50, the rectangular perforation 62 covers the near-distance RFID 50 in order to locate the near-distance RFID 50 at the vacant trough 31 of the back panel 30. The LCD display unit 70 includes a LCD back film 71 and a LCD display 72. The LCD back film 71 is installed at the groove 61 of the inside framework 60, while the LCD display 72 is installed on the top surface of the LCD back film 71. The LCD display 72 is also connected with a flat wire 721. The printed circuit board 80 has a LCD trough 81 and a keyboard unit 90 thereon and is connected with the battery unit 40. The LCD trough 81 covers the LCD display 72 in order to locate the LCD display 72 inside of the groove 61 of the inner framework 60, and the LCD display 72 is connected with the printed circuit board 80 by the flat wire 721. The printed circuit board 80 also has a to micro-control unit 100 with the control procedure inside (shown in FIG. 4), a RF unit 110 for processing the RF signals (shown in FIG. 4), an antenna unit 120 for sending and receiving the radio frequency signals (shown in FIG. 4). The front panel 20 which is embedded in the outside framework 10 covers the printed circuit board 80, while the LCD trough 21 and the keyboard slot 22 on the front panel 20 are located respectively to the LCD display 72 and the keyboard unit 90. In addition, after completion the assembly of the information exchange device in accordance with the above assembly sequence, a specific control procedure could be set to the micro-control unit 100 through the seal groove 32 on the back panel 30, after that, a block 33 could be filled into the seal groove 32. With above simple structure, the information exchange device of the present invention is portable with the characteristics of small thickness. Furthermore, the keyboard unit is a capacitive touch sensor keyboard, which make the information exchange device of the present invention has the characteristics of anti-fouling, waterproof and anti-wear, as a result that the information exchange device can be long-term used under the harsh environment (for example, industrial environment).

Figure 4:
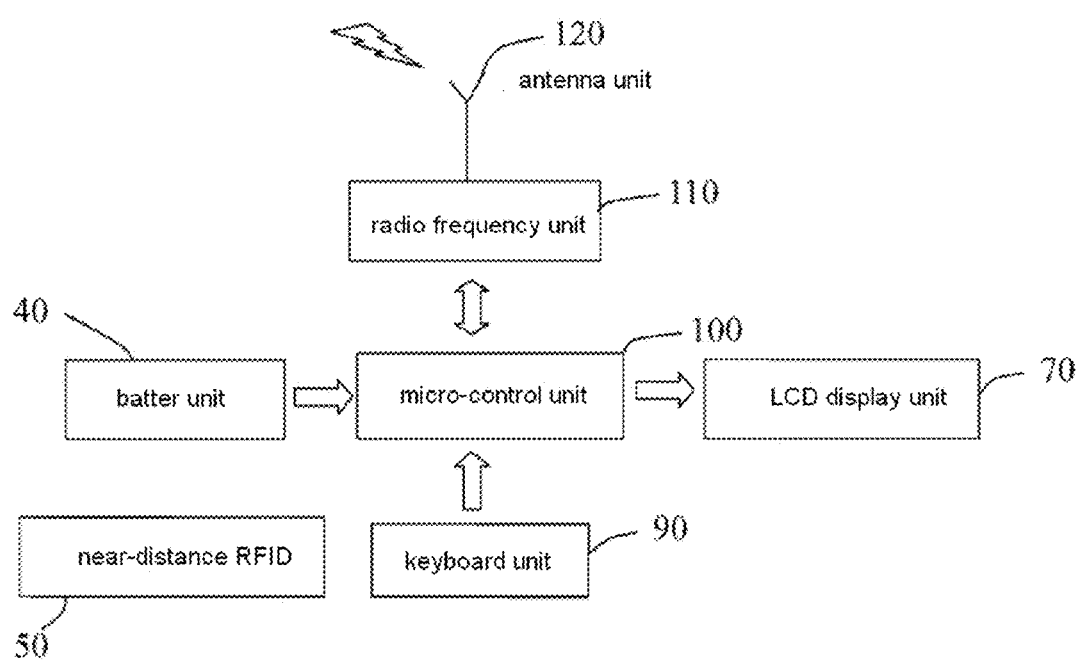
FIG. 4 is the block diagram of the control circuit of the information exchange device of the present invention.

The information exchange device of the present invention implement the information exchange with the reading system by the control circuit. As shown in FIG. 4, the control circuit includes a micro-control unit 100, a batter unit 40, a keyboard unit 90, a RF unit 110, an antenna unit 120, a LCD display unit 70 and a near-distance RFID 50. The micro-control unit 100 is connected with the batter unit 40, the keyboard unit 90, the RF unit 110 and the LCD display unit 70 respectively, wherein the near-distance RFID 50 is a separated unit that it does not connect with the above units. The batter unit 40 provides power to the micro-control unit 100 to makes the micro-control unit 100 work and provides RF energy required to communicate between the information exchange device and the reading system. The information exchange device of the invention is an active RFID that an information exchange of long-range, low-power could achieve. As this information exchange device of the invention has the characteristics of low power, the batter unit 40 can maintain the information exchange device working more than 5 years that the present invention has the advantage of long-term use and maintenance-free. The keyboard unit 90 is connected with the input of the micro-control unit 100, when the information exchange device holder is pressed the keyboard unit 90 in accordance with his own choice, the corresponding signal will be generated and transmitted to the micro-control unit 100. The RF unit 110 is connected with the micro-control unit 100 by a two-way communication links, the RF unit 110 is also connected with the antenna unit 120 which is used to receive and send the RF signals. The role of the RF unit 110 is to process the RF signals transmitted from the keyboard unit 90 and the RF signals received from reading system by amplifying, filtering and other suitable signal processing method. The working frequency of the present invention is 2.45 GHz. One advantage of the present invention is that as the 2.45 GHz is a global ISM (Industrial Scientific Medical) band with a frequency range from 2.4 GHz to 2.4853 GHz and the ISM band is mainly open free of charge to three fields, i.e. industrial, scientific and medical, the information exchange device of the present invention does not need the license of this band to work. Furthermore, the use of the microwave band can not only achieve long-distance and low power consumption of the information exchange, but also prevent the signal collision phenomenon when a number of the information exchange devices communicate with the reading systems at the same time. In the case that the information exchange device has entered the reading scope of the reading system, when the information exchange device holder pressed the keyboard unit 90, the micro-processing unit 100 will sent the corresponding signal to the RF unit 110, then this signal will be sent to the reading system by the antenna unit 120 at the working frequency of 2.45 GHz. When the reading system send the RF signal to the information exchange device at the working frequency of 2.45 GHz, the signal will be received by the antenna unit 120 and subsequently will be processed by the RF unit 110 and then will be sent to the micro-processing unit 100. Though the above process, the information exchange between the information exchange device of the present invention and the reading system is realized. The LCD display unit 70 is connected with the output of the micro-control unit 100, which is used to show the signal on the LCD display 72, wherein the signal includes the corresponding information sent by the information exchange device holder pressing the keyboard unit 90 and the corresponding information sent by the reading system, as a result that the information exchange device holder could see the information intuitively. As mentioned before, the working frequency of the near-distance RFID 50 is 13.56 MHz, so it could be used for the near-distance RF communications.

The information exchange device of the present invention can be applied to the campus, the hospital, the nursing home, the meeting places and so on. Take the campus as an example to illustrate the specific application of the present invention. As the information exchange device of the present invention includes a near-distance RFID 50 with the working frequency of 13.56 MHz, the present invention will have many functions, such as access control management, micro-payment functions and so. Specifically, when the students need to enter the campus or library, etc., the students locate the information exchange devices close to the door reader, and then the door reader opens the door by reading the information of the student stored in the information exchange devices, thus the function of access control management achieves. When the students need to eat or purchase goods, the students locate the information exchange devices close to the reader of canteen, the reader can deduct the corresponding costs from the balance stored in the information exchange devices, thus the function of micro-payment achieves. As the information exchange device of the present invention is an active RFID with the working frequency of 2.45 GHz, the information communication can be reliably realize between the reading system and the information exchange device within the range of tens of meters, as a result that the present invention can realize some function such as personnel tracking, interactive teaching and so on. Specifically, when students enter the campus, the information exchange devices held by the students can look for the reading system nearby and then establish the real-time communication system, thus the function of personnel tracking achieves. When the teachers need to do classroom quizzes to test the effects of teaching, the teachers send the questions by the reading system to to the information exchange devices held by the students, the questions will be displayed in the LCD display 72 of every information exchange device, the students choose the corresponding answers by pressing the keyboard unit 90 after reading the questions, and then the answers can also be displayed in the LCD display 72. As the information exchange device held by each student is has a unique ID number, the ID number associated with the answers will be sent to the reading system of the teachers, as a result that the teachers can determine the class effect of each student and the overall teaching effectiveness. As mentioned above, the information exchange device of the present invention can realize the function of interactive teaching.

Throughout the description and drawings, numerous exemplary embodiments were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed is:

1. An information exchange device comprises an outside framework, a front panel and a back panel, wherein the front panel is embedded in the front surface of the outside framework, the back panel is embedded in the back surface of the outside framework, whereby a vacant space is formed inside of the outside framework, wherein the vacant space further comprises a control circuit used for controlling the information exchange between the information exchange device and the reading system, which comprises a micro-control unit with the control procedures therein, the back panel has a seal groove used to set a specific control procedure to the micro-control unit and a block used to fill the seal groove;
   a batter unit connected with the micro-control unit, which provides the power to the micro-control unit and provides the RF energy required in the communication between the information exchange device and the reading system;
   a keyboard unit connected with the input of the micro-control unit, which sends the corresponding RF signal to the microprocessor;
   a RF unit having a two-way communication links with the micro-control unit, which processes the signal transmitted by the keyboard unit and the signal received from reading system;
   an antenna unit connected with the RF unit, which sends the signal transmitted by the keyboard to the reading system at the working frequency of 2.45 GHz and receives the RF signals sent by the reading system at the working frequency of 2.45 GHz;
   a LCD display unit connected with the output of the micro-control unit, which shows the corresponding information sent by the keyboard unit and the corresponding information sent by the reading system;
   a near-distance RFID with the working frequency of 13.56 MHz, which is used for the short distance RF communication.

2. The information exchange device of claim 1 wherein the micro-control unit, the keyboard unit, the RF unit, the antenna unit are positioned on the printed circuit board, wherein the LCD display unit includes a LCD display and a LCD back film disposed under the LCD display, wherein the LCD display has a flat wire which connected with the printed circuit board, wherein the batter unit is connected with the printed circuit board.

3. The information exchange device of claim 2 wherein the vacant space has an inner framework, wherein the near-distance RFID is disposed between the under surface of the inner framework and the inside surface of the back panel, wherein the LCD display unit is disposed between the top surface of the inner framework and the printed circuit board, wherein the batter unit is disposed on the inner surface of the back panel.

4. The information exchange device of claim 3 wherein the inner framework has a groove on the top surface which further has a perforation therein, wherein the LCD display unit is disposed in the groove and the near-distance RFID is positioned in the perforation.

5. The information exchange device of claim 4 wherein the printed circuit board further has a LCD trough covered the LCD display.

6. The information exchange device of claim 5 wherein the front panel further has a keyboard slot covered the keyboard unit and a LCD slot covered the LCD display unit.

7. The information exchange device of claim 6 wherein the back panel has a vacant trough and the near-distance RFID is disposed in the vacant trough.

8. The information exchange device of claim 6 wherein the keyboard unit is a capacitive touch sensor keyboard.

9. The information exchange device of claim 5 wherein the keyboard unit is a capacitive touch sensor keyboard.

10. The information exchange device of claim 4 wherein the keyboard unit is a capacitive touch sensor keyboard.

11. The information exchange device of claim 3 wherein the keyboard unit is a capacitive touch sensor keyboard.

12. The information exchange device of claim 2 wherein the keyboard unit is a capacitive touch sensor keyboard.

13. The information exchange device of claim 2 wherein the keyboard unit is a capacitive touch sensor keyboard.

14. The information exchange device of claim 1 wherein the keyboard unit is a capacitive touch sensor keyboard.

* * * * *